United States Patent

Nubel et al.

[11] Patent Number: 6,143,851
[45] Date of Patent: Nov. 7, 2000

[54] PROCESS FOR PREPARATION OF ADDITION PRODUCTS OF DIFUNCTIONAL TELECHELIC POLYOLEFINS FROM CYCLIC OLEFINS BY OLEFIN METATHESIS REACTION

[75] Inventors: Philip O. Nubel; Howard B. Yokelson, both of Naperville; William H. Frye, Lisle; Tsuei-Yun Lynch, Naperville; Larry C. Satek, St. Charles; George A. McConaghy, Naperville, all of Ill.

[73] Assignee: BP Amoco Corporation, Chicage, Ill.

[21] Appl. No.: 09/537,122

[22] Filed: Mar. 29, 2000

Related U.S. Application Data

[62] Division of application No. 08/907,357, Aug. 7, 1997, Pat. No. 6,060,570.
[60] Provisional application No. 60/023,821, Aug. 12, 1996.
[51] Int. Cl.⁷ ...................................................... C08F 32/00
[52] U.S. Cl. .......................... 526/308; 526/159; 526/171; 526/190; 526/213; 526/281; 526/321; 526/322; 526/336; 525/329.5; 525/329.6; 525/332.1; 525/338; 525/339
[58] Field of Search .................................... 526/308, 281, 526/336, 321, 322, 213, 190, 159, 171; 525/329.5, 329.6, 332.1, 338, 339

[56] References Cited

U.S. PATENT DOCUMENTS 5,049,693  9/1991  Himmler ................................. 558/467
5,512,635  4/1996  Nubel et al. ............................ 525/247

*Primary Examiner*—David W. Wu
*Assistant Examiner*—Caixia Lu
*Attorney, Agent, or Firm*—James R. Henes; Stephen L. Hensley

[57] ABSTRACT

A process for the preparation of an addition product of a linear telechelic difunctional unsaturated polymer containing terminal functional reactive groups other than vinyl groups, involves simultaneously reacting at least one cyclic olefin of from about 4 to 30 carbon atoms, at least one difunctional acyclic olefin of up to about 30 carbon atoms, and at least one reactant YZ in the presence of at least one olefin metathesis catalyst to prepare an addition product of a linear difunctional unsaturated polymer, wherein YZ is capable of adding to a carbon—carbon double bond under ROMP reaction conditions.

16 Claims, No Drawings

PROCESS FOR PREPARATION OF ADDITION PRODUCTS OF DIFUNCTIONAL TELECHELIC POLYOLEFINS FROM CYCLIC OLEFINS BY OLEFIN METATHESIS REACTION

REFERENCE TO RELATED APPLICATION

This is a divisional of application Ser. No. 08/907,357, filed Aug. 7, 1997, now U.S. Pat. No. 6,060,570, which claims the benefit of U.S. provisional application Ser. No. 60/023,821, filed Aug. 12, 1996.

BACKGROUND OF THE INVENTION

This invention is directed to a process to prepare addition products of difunctional telechelic polyolefins containing functional groups which predominantly comprise terminal functional reactive groups by a simultaneous ring-opening olefin metathesis polymerization (ROMP) and addition reaction in the presence of cyclic olefins, difunctional acyclic olefins, and reagent (YZ) which undergoes addition to carbon-to-carbon double bonds.

Conventional ring-opening olefin metathesis polymerization (ROMP) is the catalyzed reaction of a cyclic olefin monomer to yield an unsaturated polymer as follows:

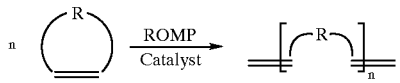

Procedures to prepare polymeric hydrocarbons having reactive functional endgroups have utilized cyclic olefinic compounds in conjunction with a ring opening step. Ofstead (U.S. Pat. No. 3,597,403) teaches a process for ring-opening polymerization of unsaturated alicyclic compounds (preferably unsaturated alicyclic compounds of a single unsaturated alicyclic ring containing at least four carbon atoms and not more than five carbon atoms wherein the carbon-to-carbon double bonds in the ring are not adjacent and are non-conjugated) in the presence of a catalyst system comprising an alkylaluminum halide, molecular oxygen, and a compound of tungsten or molybdenum. Streck et al. (U.S. Pat. No. 3,798,175) teaches a process for ring opening polymerization of cyclic olefins and forming terminal carbalkoxy groups by employing a catalyst system consisting essentially of (1) a tungsten or molybdenum compound, (2) an organo aluminum compound, and (3) an unsaturated carboxylic acid ester. Streck et al. (U.S. Pat. No. 3,857,825) discloses a process for production of polymeric hydrocarbons having reactive silyl end groups by a ring-opening polymerization of a cyclic olefin in the presence of a catalytic amount of a halogenated compound of a metal selected from the group consisting of niobium, tantalum, molybdenum, tungsten and rhenium and a halogen, alkoxy, carboxylate or Lewis acid.

Although the prior art teaches the preparation of unsaturated polymeric hydrocarbons having functional endgroups such as esters, amines, alcohols and other reactive groups, there has been no reported success in the preparation of addition products of difunctional telechelic polyolefins by simultaneous olefin metathesis reaction and addition reaction wherein the resulting difunctional telechelic polyolefins contain addition moieties which restrict or entirely change the olefinic characteristics of the resultant product. A potential problem of performing the olefin metathesis and addition reactions simultaneously is that the olefin reactants (especially the cyclic olefins) might rapidly undergo the addition reaction, yielding saturated molecules unable to undergo olefin metathesis. In such a case little or no polymer product would be obtained. Surprisingly, this is not a serious problem in the present invention and good yields of the partially-saturated polymer products can be obtained.

Utilizing the simultaneous ROMP and addition reaction process of the present invention, the resultant product has additional beneficial properties compared to ordinary unsaturated difunctional telechelic polyolefins such as being more oxidatively stable, resistant to attack by ozone and less susceptible to degradation due to exposure to UV light, and is suitable for further reactions. The process of the claimed invention saves time and eliminates the potential need for employing two separate reactors (for the ROMP reaction and for the addition reaction) and isolating the intermediate unsaturated polyolefin product of the ROMP reaction.

SUMMARY OF THE INVENTION

This invention relates to a process for the preparation of an addition product of a linear telechelic difunctional unsaturated polymer containing terminal functional reactive groups other than vinyl groups, involves simultaneously reacting at least one cyclic olefin of from about 4 to 30 carbon atoms, at least one difunctional acyclic olefin of up to about 30 carbon atoms, and at least one reactant YZ in the presence of at least one olefin metathesis catalyst to prepare an addition product of a linear difunctional unsaturated polymer, wherein YZ is capable of adding across a carbon—carbon double bond under ROMP reaction conditions.

DETAILED DESCRIPTION OF THE INVENTION

This invention relates to a polymerization process for preparation of addition products of telechelic difunctional polymers from cyclic olefins of up to about 30 carbon atoms and acyclic olefins of up to about 30 carbon atoms by a ring opening metathesis polymerization reaction in the presence of reactant YZ which undergoes addition to carbon-to-carbon double bonds.

In the present invention the ROMP reaction is performed simultaneously with the addition reaction in the presence of cyclic olefins, difunctional acyclic olefins, and reagent (YZ) which undergoes addition to carbon-to-carbon double bonds. A polymer product is thus obtained in which some or all of the carbon-to-carbon double bonds in the polymer have undergone addition reactions due to the presence of YZ and the olefin metathesis reaction catalyst. The addition reaction is as follows:

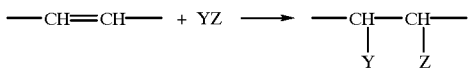

Reagent YZ is generally any compound which is capable of undergoing addition to carbon-to-carbon double bonds, especially by electrophilic or by free radical addition mechanisms. Typical examples of YZ are molecular hydrogen (including deuterium), water, hydrogen peroxide, halogens (including $F_2$, $Cl_2$, $Br_2$, and $I_2$), hydrogen halides (including HF, HCl, HBr, and HI), inorganic halohydrins (wherein Y is a halogen and Z is hydroxyl), sulfuric acid, halogenated carbon compounds of up to 30 carbon atoms (preferably up to about 12 carbon atoms, more preferably up to about 8 carbon atoms, most preferably up to about 6 carbon atoms, including $CF_4$, $CCl_4$, $CBr_4$, $Cl_4$, Br—$CCl_3$ and Cl—$CBr_3$), alkyl and aryl halides of up to 30 carbon atoms (preferably up to about 12 carbon atoms, more preferably up to about 8 carbon atoms, most preferably up to about 6 carbon atoms), alcohols of the structure ROH wherein R is an alkyl, aryl, arylalkyl, halogenated alkyl, halogenated aryl, or halogenated arylalkyl group of up to 30 carbon atoms (preferably up to about 12 carbon atoms, more preferably up to about 8 carbon atoms, most preferably up to about 6 carbon atoms), and mixtures thereof; halogens as used herein include F, Cl, Br, and I. Preferably, Y is H or a halide and Z is H, a halide, or hydroxyl; most preferably, Y and Z are selected from H and halide atoms. More than one YZ reactant may be present in the reaction to prepare a mixture of products; YZ containing Br would be expected to yield a product which is flame retardant. The addition reaction is performed simultaneously, i.e., concurrently with the olefin metathesis reaction (ROMP). Such a simultaneous reaction saves time, increases throughput, and reduces the amount of equipment required (thus saving capital) in comparison to two step processes which involve an initial metathesis reaction followed by an addition reaction.

The addition reaction may be performed with or without the aid of an added addition reaction catalyst. The same catalyst employed for the ROMP reaction may be employed for the addition reaction. Alternatively, the addition reaction catalyst may be a different catalyst. Examples of catalysts for the addition reaction, where YZ=$H_2$, are well known hydrogenation catalysts such as homogeneous and heterogeneous catalysts based upon Ni, Fe, Co, Cu, Pt, Pd, Ir, Ru, Rh, Re, Ag, and Au (e.g., Raney nickel; soluble Ru compounds; metals supported on carbon, charcoal, silica, alumina, titania, or other supports). Generally, a catalyst different from the catalyst employed for the ROMP reaction is not required and is generally not used, for example when the reactant YZ is $H_2$, halogen (including $F_2$, $Cl_2$, $Br_2$, and $I_2$) or a hydrogen halide (including HF, HCl, HBr, and HI).

Cyclic olefin reactants which may be used in the present process are well known in the art. In general, any one or more cyclic olefins, each of from 4 to about 30 carbon atoms, may be utilized to prepare the olefinic compounds of this invention. The cyclic olefin may be any monocyclic or polycyclic monoene or polyene which undergoes ring-opening olefin metathesis, such as cyclobutene, cyclopentene, cycloheptene, cyclooctene, cyclodecene, cyclododecene, 1,5-cyclooctadiene, 1,5,9-cyclododecatriene, norbornene, dicyclopentadiene, and cyclic olefins with substituents on the ring(s).

The preferred unsaturated alicyclic compounds are those comprising a single unsaturated alicyclic ring. These alicyclic rings may be mono- or multi-substituted by such groups as alkyl, aryl, arylalkyl, and halogen groups.

Representative examples of unsaturated alicyclic compounds containing a single alicyclic ring having at least 4 and not more than 5 carbon atoms in the cyclic ring and containing one double bond in said ring are cyclobutene and cyclopentene. Representative examples of unsaturated alicyclic compounds containing at least seven carbon atoms in the cyclic ring and containing one or more non-conjugated carbon-to-carbon double bonds in the cyclic ring include cyclooctene; 1,4- and 1,5-cyclooctadiene; 1,4,7-cyclononatriene, cyclodecene, cyclododecene, 1,4-, 1,5- and 1,6-cyclodecadiene: 1,4-, 1,5-, 1,6- and 1,7-cyclododecadiene; 1,4,7- and 1,5,9-cyclododecatriene and the like.

The most preferred unsaturated alicyclic compounds of this invention are those containing from one to three carbon-to-carbon double bonds in the ring and in which the double bonds are located in relation to each other in a manner that they are not adjacent and are non-conjugated. Representative examples of such preferred materials are cyclobutene, cyclopentene, cyclooctene, cyclododecene, and 1,5-cyclooctadiene, 1,5,9-cyclododecatriene and 1,9,17-cyclotetracosatriene.

Representative examples of substituted alicyclic compounds are alkyl-substituted compounds such as 1-methyl-1,5-cyclooctadiene; aryl-substituted compounds such as 3-phenyl-1-cyclooctene; aralkyl-substituted compounds such as 3-benzyl-1-cyclooctene; alkaryl-substituted compounds such as 3-tolyl-1-cyclooctene and halogen-substituted compounds such as a 5-chloro-1-cyclooctene, 1-chloro-1,5-cyclooctadiene; 5-chloro-1-cyclododecene and 5,6-dichloro-1-cyclooctene. Mixtures of the unsaturated alicyclic compounds are suitable, including both substituted unsaturated alicyclic compounds and the unsubstituted unsaturated alicyclic compounds.

Generally, the cyclic olefin is selected from cycloheptene; 1,3-cyclooctadiene; 1,4-cyclooctadiene: 1,5-cyclooctadiene, norbornene, norbornadiene, 2,2,2-bicyclooctene-2; cyclooctene; cyclodecene; methyl cyclooctadienes; dimethyl cyclooctadienes; methyl cyclooctenes; dimethyl cyclooctenes; 1,4,7-cyclononatriene; 1,4-cyclodecadiene; 1,5-cyclododecadiene; 1,6-cyclodecadiene; 1,7-cyclododecadiene; 1,4,7-cyclododecatriene; 1,5,9-cyclododecatriene; trimethyl 1,5,9-cyclododecatriene; cyclopentene; cyclododecene; cyclobutene; 1,9,17-cyclotetracosatriene; 1-methyl-1,5-cyclooctadiene; 3-phenyl-1-cyclooctene; 3-benzyl-1-cyclooctene; 3-tolyl-cyclooctene; 5-chloro-1-cyclooctene; 1-chloro-1,5-cyclooctadiene; 5-chloro-1-cyclododecene; 5,5-dichloro-1-cyclooctene; and mixtures thereof.

Difunctional acyclic olefin reactants which may be used in the present process are also well known in the art. The difunctional acyclic olefin may be any acyclic olefinic compound which contains two functional groups (e.g., hydroxyl, nitrile, ester, alcohol, amine, acid, acyl halide, ketone, aldehyde, borane, amide, acid anhydride, ether, imide, halogen atom, alkyne, alkyl, aryl and substituted aryl groups of up to about 30 carbon atoms, and mixtures thereof, the substituents of said substituted aryl group comprising at least one reactive substituent of said functional reactive group of moieties), with one such functional group on each side of the carbon—carbon double bond in the olefinic compound. The two functional groups are generally identical, though the two functional groups may be different from each other. Examples of difunctional acyclic olefins include 3-hexenedioic acid, ester derivatives of 3-hexenedioic acid (e.g., dialkyl such as dimethyl 3-hexenedioate and diethyl 3-hexenedioate), 2-butene-1,4-diol, esters of 2-butene-1,4-diol (e.g., monoacetate, diacetate, monopropionate, dipropionate, monobutyrate, dibutyrate, monobenzoate, monopivalate, dipivalate, and dibenzoate), and mixtures thereof.

The difunctional acyclic olefins are produced by known processes, for example, by a process (described in U.S. Pat. No. 5,512,635 which is incorporated herein by reference its entirety) comprising an olefin metathesis reaction of acyclic linear olefinic compound reactants comprising at least one of said acyclic olefinic compound reactants containing up to 30 carbon atoms and containing at least one functional reactive group (the acyclic olefin may have two functional groups with one such functional group on each side of the carbon—carbon double bond in the olefinic compound) selected from reactive moieties consisting of a hydroxyl, nitrile, ester, alcohol, amine, acid, acyl halide, ketone, aldehyde, borane, amide, acid anhydride, ether, imide, halogen atom, alkyne, alkyl, aryl and substituted aryl groups of up to about 30 carbon atoms, and mixtures thereof, the substituents of said substituted aryl group comprising at least one reactive substituent of said functional reactive group of moieties, and combinations of said reactive moieties to prepare a linear functional olefinic compound product having two functional terminal reactive moieties, and an olefinic compound product of lower molecular weight than said one of acylic linear olefinic compound reactants. Before the resulting difunctional acylic olefin can be utilized in the present process, it is necessary to remove by known methods (e.g., described in U.S. Pat. No. 5,512,635) the olefinic compound product of lower molecular weight; if it is not removed then it can react with the cyclic olefin (ROMP reaction step) to yield polymers with nonfunctional endgroups. For example, the typical lower molecular weight olefinic compound produced is ethylene which would react with cyclic olefin to yield polymers with vinyl endgroups.

Examples of acyclic linear olefinic compound reactants include alkyl or aryl acrylates, alkyl or aryl methacrylates, and alkyl or aryl undecylenates of up to 30 carbon atoms, allyl acetate, allyl propionate, allyl butyrate, allyl benzoate, allyl pivalate, and vinyl acetate.

The cyclic olefin/acyclic olefin mole ratio employed in the process influences the molecular weight of the product and can be from about 1:1 to about 10,000:1, preferably 1:1 to 1,000:1, more preferably 1:1 to 500:1, most preferably 1:1 to 250:1. The quantity of YZ compound(s) employed in relation to the amounts of olefin reactants influences the degree of saturation of the polyolefin product. Thus the use of greater quantities of YZ (relative to the olefin reactants) tends to produce a greater degree of saturation in the polyolefin. Generally, the cyclic olefin/YZ mole ratio can range from 1:10,000 to 10,000:1, preferably 1:1,000 to 1,000:1, more preferably 1:100 to 100:1.

The invented process is generally conducted with the catalyst(s) dissolved and/or suspended in a liquid medium consisting primarily of the reactant olefins and YZ compound(s) either in neat form or dissolved in a solvent. A variety of solvents may be employed, including aliphatics such as pentane, hexane, heptane, decane, decalin, and dichloromethane, and aromatics such as benzene, toluene, xylenes, chlorobenzene, and dichlorobenzene. Preferably, if a solvent is used, then the solvent is purified by methods well known in the art such as fractional distillation to remove impurities such as olefins with vinyl groups or acyclic olefins.

The process of this invention is conducted at suitable ROMP reaction conditions. Generally these conditions include a temperature ranging from about −20° C. to about 250° C. (preferably about 0° C. to about 200° C. and more preferably about 20° C. to about 150° C.) and a pressure ranging from subatmospheric to high pressure (typically about 0.1 to about 1000 atmospheres, preferably 1 to about 200 atmospheres and most preferably about 2 to 50 atmospheres). The reaction time is selected to effect the desired extent of reaction at the selected conditions and may extend up to about 24 hours and preferably is about 5 minutes to about 10 hours. The reaction is conducted under a suitable atmosphere such as nitrogen, argon, helium, carbon dioxide, and hydrogen.

The process is conducted in the presence of a olefin metathesis catalyst, for example metathesis catalyst systems known in the art such as those described by Noels et al. (A. Demonceau, A. F. Noels, E. Saive, and A. J. Hubert, *J. Mol. Catal.*, 1992, 76: 123–132; A. W. Stumpf, E. Saive, A. Demonceau, and A. F. Noels, *J. Chem. Soc., Chem. Commun.*, 1995, pages 1127–1128) and Grubbs et al. (P. Schwab et al., *Angew. Chem. Int. Ed. Engl.*, 1995, 34: 2039–2041; P. Schwab, R. H. Grubbs, and J. W. Ziller, *J. Am. Chem. Soc.*, 1996, 118: 100–110). Preferably, a ruthenium-based metathesis catalyst system is utilized which contains a ruthenium compound (A), a phosphorus compound (B), and a compound (C) containing a carbon-to-carbon triple bond; this ruthenium-based metathesis catalyst system does not employ a diazo compound as a catalyst component or precursor. The mole ratio of compounds A:B:C is typically in the range of about 1.0:0.01–100:0.01–100. The ruthenium compound (A) is a Ru(II), Ru(III), or Ru(IV) compound containing an anionic ligand (X) and optionally an arene ligand and optionally a phosphorus compound ligand. The phosphorus compound (B) is optional if the ruthenium compound (A) contains a phosphorus-containing ligand.

The ruthenium compounds (A) of the preferred catalyst include, for example, Ru(II), Ru(III), and Ru(IV) compounds containing an anionic ligand (X) and optionally containing an arene ligand and optionally a phosphorus compound ligand (e.g., phosphine or phosphite). Generally, the ruthenium compound is represented by the formula

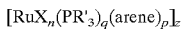

$[RuX_n(PR'_3)_q(arene)_p]_z$ where n=2,3, or 4; q=0, 1,2,3, or 4; p=0 or 1; and z=1 or 2.

X is an anionic ligand (a negatively charged moiety). X may be an aliphatic anionic ligand containing up to about 20 carbon atoms or an aromatic anionic ligand containing up to about 20 carbon atoms. X also may be selected from negatively charged groups such as halogens, hydroxides, or alkoxides, or X may be nitrate ($NO_3$), nitrite ($NO_2$), acetate ($CH_3CO_2$), trifluoroacetate ($CF_3CO_2$), acetylacetonate ($CH_3COCHCOCH_3$), hexafluoroacetylacetonate ($CF_3COCHCOCF_3$), and mixtures thereof.

The phosphorus compound ligand ($PR'_3$) may be a phosphine or phosphite. R' is selected from R and (OR) where each of the R groups of phosphite or phosphine are the same or are independent and may be selected from the group consisting of hydrogen, alkyl, cycloalkyl, aryl and arylalkyl groups, unsubstituted or substituted, each group of up to about 20 carbon atoms; the substituents may be halogen, or alkyl or aryl moieties of up to 20 carbon atoms. If R' is OR then R' and R are not hydrogen. If R' is R then at least one R is not hydrogen. In other words, the phosphorus compound ligand is not $PH_3$, $P(OH)_3$, $PR(OH)_2$, $PR_2(OH)$, $PH(OH)_2$, or $PH_2(OH)$.

The arene ligand may be an aromatic ligand of up to about 30 carbon atoms, substituted or unsubstituted; the substituents of the substituted aromatic ligand may be selected from the group consisting of halogen, alkyl and aryl groups of up to about 25 carbon atoms, trialkylsilyl and triarylsilyl groups of up to about 25 carbon atoms, and mixtures thereof. The aromatic ligand may be selected from alkylbenzenes, polyalkylbenzenes, arylbenzenes, polyarylbenzenes, halobenzenes, haloalkylbenzenes, haloarylbenzenes, alkylnaphthalenes, arylnaphthalenes, polyalkylnaphthalenes, polyarylnaphthalenes, halonaphthalenes, haloalkylnaphthalenes, and haloarylnaphthalenes. The aromatic ligand may be, among others, benzene, toluene, xylene, cumene, cymene, p-cymene, durene, trimethylsilylbenzene, 1,4bis(trimethylsilyl) benzene, or naphthalene.

The ruthenium compound (A) useful in the catalyst includes, among others, $[RuX_2(arene)]_2$, $RuX_2(arene)(PRR^1R^2)$, $RuX_2(arene)(PHRR^1)$, $RuX_2(arene)(PH_2R)$, $RuX_2(arene)[P(OR)(OR^1)(OR^2)]$, $RuX_3$, $RuX_3$-hydrate, $RuX_2(PRR^1R^2)_3$, $RuX_2(PHRR^1)3$, $RUX_2(PH_2R)_3$, $RuX_2[P(OR)(OR^1)(OR^2)]_3$, $RUX_2(PRR^1R^2)_4$, $RuX_2(PHRR^1)4$, $RuX_2(PH_2R)_4$, or $RuX_2[P(OR)(OR^1)(OR^2)]_4$ where P is phosphorus.

The R groups of the phosphorus compound ligand of the ruthenium compound (A), e.g, R, $R^1$ and $R^2$ above, may be the same or are independently selected from the group consisting of alkyl, cycloalkyl, aryl, and alkylaryl groups, unsubstituted or substituted, each group of up to about 20 carbon atoms (preferably up to about 12 carbon atoms, more preferably up to about 8 carbon atoms, most preferably up to about 6 carbon atoms); the substituents may be halogen (F, Cl, Br, and I), alkyl or aryl moieties of up to about 20 carbon atoms (preferably up to about 12 carbon atoms, more preferably up to about 8 carbon atoms, most preferable up to about 6 carbon atoms).

X is selected from the group consisting of an aliphatic anionic ligand (negatively charged aliphatic moiety; for example up to about 20 carbon atoms, preferably up to about 12 carbon atoms, more preferably up to about 8 carbon atoms, most preferably up to about 6 carbon atoms such as methyl, ethyl, propyl, isopropyl, butyl, hexyl), an aromatic anionic ligand (negatively charged aromatic moiety; for example of up to 20 carbon atoms, preferably up to 12 carbon atoms, more preferably up to about 8 carbon such as phenyl, benzyl). X may be selected from negatively charged groups such as halogens (F, Cl, Br, and I), hydroxides (OH), or alkoxides ($OR^3$, where $R^3$ is selected from the group consisting of alkyl, cycloalkyl, aryl, and alkylaryl groups, each group of up to about 20 carbon atoms (preferably up to about 12 carbon atoms, more preferably up to about 8 carbon atoms, most preferably up to about 6 carbon atoms)). X may be selected from nitrate ($NO_3$), nitrite ($NO_2$), acetate ($CH_3CO_2$), trifluoroacetate ($CF_3CO_2$), acetylacetonate ($CH_3COCHCOCH_3$), hexafluoroacetylacetonate ($CF_3COCHCOCF_3$), and mixtures thereof.

The arene group of said ruthenium compound (A), e.g., $[RuX_2(arene)]_2$, $RuX_2(arene)(PRR^1R^2)$, $RuX_2(arene)(PH_2R)$, $RuX_2(arene)(PHRR^1)$, and $RuX_2(arene)[P(OR)(OR^1)(OR^2)]$, is typically based on arene derivatives of benzene and naphthalene. The arene group includes an aromatic ligand of up to about 30 carbon atoms (preferably up to about 20 carbon atoms, more preferably up to about 15 carbon atoms), substituted or unsubstituted, and mixtures thereof. The number of substituents the aromatic ligand can have depends on the aromatic nucleus; for example, a benzene nucleus can have up to six substituents, a naphthalene nucleus can have up to 8 substituents. The substituents of the substituted aromatic ligand are selected from the group consisting of halogen (e.g., F, Cl, Br, I; preferably Cl), alkyl and aryl groups of up to about 25 carbon atoms (preferably up to about 20 carbon atoms, more preferably up to about 12 carbon atoms, most preferably up to about 8 carbon atoms), trialkylsilyl and triarylsilyl groups of up to about 25 carbon atoms (preferably up to about 20 carbon atoms, more preferably up to about 15 carbon atoms, most preferably up to about 8 carbon atoms), and mixtures thereof. The aromatic ligand may be selected from alkylbenzenes, polyalkylbenzenes, arylbenzenes, polyarylbenzenes, halobenzenes, haloalkylbenzenes, haloarylbenzenes, alkylnaphthalenes, aryinaphthalenes, polyalkylnaphthalenes, polyaryinaphthalenes, halonaphthalenes, haloalkylnaphthalenes, and haloaryinaphthalenes. The aromatic ligand may be, among others, benzene, toluene, xylene, cumene, cymene, p-cymene, durene, trimethylsilylbenzene, 1,4-bis(trimethylsilyl) benzene, or naphthalene.

The phosphorus compound (B) typically is selected from the group consisting of phosphine and phosphite compounds of the formulae $PR_3$, $P(OR)_3$, $PH_2R$, $PHRR^1$, $PRR^1R^2$ and $P(OR)(OR^1)(OR^2)$. R, $R^1$ and $R^2$ are the same or are independently selected from the group consisting of alkyl, cycloalkyl, aryl and arylalkyl groups, unsubstituted or substituted, each group of up to about 20 carbon atoms (preferably up to about 12 carbon atoms, more preferably up to about 8 carbon atoms, most preferably up to about 6 carbon atoms); the substituents may be halogen (F, Cl, Br, and I), alkyl or aryl moieties of up to 20 carbon atoms (preferably up to about 12 carbon atoms, more preferably up to about 8 carbon atoms, most preferably up to about 6 carbon atoms). The phosphorus compound (B) is preferably a phosphine compound, more preferably a tri-alkyl or tri-cycloalkyl phosphine (where each alkyl or cycloalkyl is $C_3$ to $C_8$) typically selected from the group consisting of tricyclohexylphosphine, triisopropylphosphine and tricyclopentylphosphine. The phosphorus compound (B) is optional if the ruthenium compound (A) possesses a phosphorus-containing ligand. Such ruthenium compounds (A) possessing a phosphorus-containing ligand include $RuX_2(arene)(PRR^1R^2)$, $RuX_2(arene)(PHRR^1)$, $RuX_2(arene)(PH_2R)$, $RuX_2(arene)[P(OR)(OR^1)(OR^2)]$, $RuX_2(PRR^1R^2)_3$, $RuX_2(PHRR^1)_3$, $RuX_2(PH_2R)_3$, $RuX_2[P(OR)(OR^1)(OR^2)]_3$, $RuX_2(PRR^1R^2)_4$, $RuX_2(PHRR^1)_4$, $RuX_2(PH_2R)_4$, or $RuX_2[P(OR)(OR^1)(OR^2)]_4$ where P is phosphorus; these compounds are described in detail above.

Catalyst compound (C), the compound containing a carbon-to-carbon triple bond, can be a substituted or unsubstituted $C_2$ to $C_{20}$ alkyne (preferably up to about 16 carbon atoms, more preferably up to about 12 carbon atoms, most preferably up to about 8 carbon atoms) such as a terminal alkyne, an internal alkyne, or an alkyne possessing one or more (e.g., 1 or 2) aliphatic or aromatic functional substituent groups (preferably up to about 20 carbon atoms, more preferably up to about 12 carbon atoms, most preferably up to about 8 carbon atoms), halogen (F, Cl, Br, and I), ester, hydroxyl, ketone, aldehyde, ether, carboxyl, amide, anhydride, nitrile, silyl or amine functional substituent groups, and mixtures thereof. Catalyst compound (C) can be selected from the group consisting of acetylene ($C_2H_2$), propyne, 1-butyne, 2-butyne, 1-pentyne, 2-pentyne, 1-hexyne, 2-hexyne, 3-hexyne, 1-heptyne, 1-octyne, 1-decyne, 1-dodecyne, trimethylsilylacetylene, phenylacetylene, diphenylacetylene, 2-butyne-1,4-diol, ester derivatives of 2-butyne-1,4-diol such as 1,4-diacetoxy-2-butyne, 2-butyne-1,4-diol monoacetate, 2-butyne-1,4-diol diacetate, 2-butyne-1,4-diol monopropionate, 2-butyne-1,4-diol dipropionate, 2-butyne-1,4-diol monobenzoate, 2-butyne-1,4-diol dibenzoate, propargyl alcohol and ester derivatives of propargyl alcohol such as propargyl acetate, propargyl propionate, propargyl butyrate, propargyl benzoate, and propargyl pivalate.

Mole ratios of A:B:C, expressed as compounds, are typically in the range of 1:0.01–100:0.01–100 (preferably 1.0:0.140:0.140, more preferably 1.0:0.2–20:0.2–20). Mole ratios of A:B, expressed as compounds, are typically in the range of 1:0.01–100 (preferably 1.0:0.140, more preferably 1.0:0.2–20).

With the above described ruthenium-based catalyst system, it has been found that the presence of hydrogen ($H_2$) improves catalytic activity, reactant conversion, and product yield. The presence of hydrogen (typically at a partial pressure of hydrogen of from about $1 \times 10^{-2}$ mm Hg to about 200 atmospheres, preferably from about 0.1 mm Hg to about 100 atmospheres, more preferably 1 mm Hg to about 20 atmospheres, though generally pressure is not critical) as a catalyst system activator improves the catalyst activity, reactant conversion, and product yield in the process of the invention. If YZ is not $H_2$, then it is preferable that the ruthenium-based catalyst system be utilized under conditions of low $H_2$ pressure and/or low reaction temperatures if hydrogenation is not desired; such conditions are easily determined by one skilled in the art, for example, there is generally little hydrogenation (typically less than 1%) at one atmosphere and 60° C.

It is preferable that an activator be present as a component of the ruthenium-based catalyst system for increased catalytic activity, increased reactant conversion and increased product yield. It has been found that hydrogen, $H_2$, acts as an activator of the catalyst system. It is assumed that the solubility of hydrogen in the liquid phase (with the liquid phase consisting of the reactant olefins either in neat form or dissolved in a solvent) aids in the catalytic activity of the catalyst system. It is well-known that hydrogen is soluble in solvents with greater solubility of hydrogen in liquid media with increased pressure (A. Seidell, *Solubilities of Inorganic and Metal Organic Compounds,* Vol. 1, D. Van Nostrand Co., N.Y., N.Y., 1940, p. 564–567). Such solvents include the solvents listed below.

The ruthenium-based catalyst system employed is dissolved or suspended in a liquid phase, with the liquid phase consisting primarily of the reactant olefins either in neat form or dissolved in a solvent. A variety of solvents may be employed, including aliphatic solvents such as pentane, hexane, heptane, decane, decalin, and dichloromethane, aromatics such as benzene, toluene, xylenes, chlorobenzene, and dichlorobenzene, and others such as diethyl ether and tetrahydrofuran. The catalyst system can be employed under an atmosphere of nitrogen, argon, helium, air, carbon dioxide, or hydrogen, and typically at a pressure from below atmospheric (i.e., under vacuum) up to about 200 atmospheres. A hydrogen atmosphere is preferred. Generally, a wide range of temperatures, pressures and reaction times can be used. The olefin metathesis process employing the ruthenium-based catalyst system can typically be at a temperature of from about −20° C. to about 250° C. (preferably about 0° C. to about 200° C., more preferably about 20° C. to about 150° C., though generally temperature is not critical), and typically at a pressure ranging from subatmospheric to high pressure (typically from about 0.1 to about 1000 atmospheres, preferably about 1 to about 200 atmospheres, more preferably about 2 to about 50 atmospheres, though generally pressure is not critical). Typically, the reaction time (or residence time in a continuous reaction) for the olefin metathesis process employing the ruthenium-based catalyst system is selected to effect the desired extend of reaction at the selected conditions and may extend up to about 24 hours and preferably is about 5 minutes to about 10 hours.

Use of the above-described ruthenium-based metathesis catalyst system offers advantages over other metathesis catalyst systems known in the art such as those described by Noels et al. and Grubbs et al. A disadvantage of the catalysts reported by Noels et al. and by Grubbs et al. is that an organic diazo compound is employed, either as a catalyst component (Noels et al.) or as a reagent to synthesize the catalyst (Grubbs et al.). The organic diazo compounds employed by Noels et al. and Grubbs et al. are expensive and are not commercially available in large quantities. Furthermore, many of these diazo compounds (such as phenyldiazomethane) are dangerously unstable and may explode even at room temperature (X. Creary, *Org. Synth., Coll.* Vol. 7, 1990, pages 438–443). In a preferred embodiment, the present invention utilizes the previously described ruthenium-based metathesis catalyst system for metathesis (e.g., of low-strain cyclic olefins and acyclic olefins), such a catalyst system does not employ a diazo compound as a catalyst component or precursor.

The linear non-crosslinked difunctional telechelic partially saturated polymers prepared by the process of this invention are typically true linear compounds of strictly regular structure with exactly defined terminal groups. As is well known, side reactions may occur during olefin metathesis reactions. These side reactions include alkylation, isomerization, cyclization, and double bond migration. Surprisingly, it has been found that these side reactions are minimal or nonexistent in cross-metathesis reactions under the conditions of the present invention. The average functionality number of telechelic difunctional polymers prepared by the process of this invention is about 2 (e.g., 1.95 to 2.0, preferably 1.96 to 2.0, more preferably 1.98 to 2.0, most preferably 2.0), as determined by nuclear magnetic resonance spectroscopy ($^{13}C$ NMR). The methodology used to determine functionality number ($F_n$) by NMR is very important and is described in Examples 3, 4, 5, and 6 of U.S. Pat. No. 5,559,190. The functionality number determined by the nuclear magnetic resonance spectroscopy procedure is also described by Nubel, P. O., et al., "Preparation of an ester-terminated telechelic polybutadiene by a two-step olefin metathesis process", *Journal of Molecular Catalysis A: Chemical* (1997), 115: 43–50. In order to distinguish $F_n$ 2.0 from, for example, $F_n$ 1.9 or lower it is necessary to identify and quantify all resonances, including those which are very weak (i.e., of low intensity), in the NMR spectra. This is done to identify and quantify all endgroup types to enable computation of Fn. Low levels of nonfunctional endgroups are important in distinguishing $F_n$ 2.0 from, for example, $F_n$ 1.9 or lower. As theoretical examples, 5 mole % of nonfunctional endgroups (95 mole % functional endgroups) in a difunctional telechelic linear polymer corresponds to $F_n$=1.9; 10 mole % of nonfunctional endgroups (90 mole % functional endgroups) corresponds to $F_n$=1.8. Thus, it is necessary to determine if nonfunctional endgroups are present in the polymer down to a level of about 5 mole % or lower relative to the functional endgroup type. This can be done by using special NMR conditions (e.g., signal-to-noise ratio of about 100:1) as described in U.S. Pat. No. 5,559,190 and in the Nubel et al. article.

The telechelic difunctional polymers prepared by the process of the instant invention are prepared by olefin metathesis reactions which are cross-metathesis reactions. Cross-metathesis reactions have been generally classified as being of three categories: (1) exchange of atoms between two olefinic compounds to produce two different olefinic compounds, (2) ring-opening of a cyclic olefinic compound to produce acyclic polymers, and (3) degradation of olefinic polymers to produce oligomers of lower molecular weight. The reactions of the present invention are of the three categories.

Non-crosslinked linear telechelic difunctional polymers obtained by the process of this invention are defined as polymers consisting essentially of strictly linear hydrocarbon chains comprising repeating monomer units of 3 to 30 carbon atoms. The number of monomer repeating units generally may be from 3 to about 10,000 (preferably 3 to 1,000, more preferably 3 to 500, most preferably 3 to 250).

Non-crosslinked linear difunctional telechelic polymers prepared by the process of this invention are defined as difunctional polymers containing terminal functional endgroups and the average functionality number is about 2 (e.g., 1.95–2.0, preferably 1.96 to 2.0, more preferably 1.98 to 2.0, most preferably 2.0), as determined by NMR; the functionality ($F_n$) of about 2 of the addition product refers to the terminal groups, it does not refer to the groups added due to the YZ reactant.

The purity of the reactants, especially the cyclic olefin monomer (e.g., 1,5-cyclooctadiene (COD)). is critical in obtaining a 2.0 functionality. The importance of the purity of the cyclic olefin monomer in obtaining a 2.0 functionality is clearly illustrated in Examples 4. 5, and 6 of U.S. Pat. No. 5,559,190. 4-Vinyl-1-cyclohexene is an impurity in commercial COD that is formed in the manufacture of COD from butadiene. Olefins with vinyl groups such as 4-vinyl-1-cyclohexene can act as undesired chain transfer agents in ring-opening metathesis reactions, yielding polymer products with vinyl endgroups (*Olefin Metathesis,* K. J. Ivin, Academic Press, New York, 1983, Chapter 15, pages 282–288). Examples 4–6 of U.S. Pat. No. 5,559,190 clearly demonstrate that the use of a lower purity COD reactant (containing 0.2% of 4-vinyl-1-cyclohexene) resulted in a polymer product having a significant amount of the undesired vinyl (non-functional) endgroup type. The 0.2% level of 4-vinyl-1-cyclohexene in Example 6 of U.S. Pat. No. 5,559,190 was present in a commercial COD product obtained from Aldrich Chemical Co. The importance of the 4-vinyl-1-cyclohexene impurity is further discussed by Nubel et al. in "Preparation of an ester-terminated telechelic polybutadiene by a two-step olefin metathesis process", *Journal of Molecular Catalysis A: Chemical* (1997), 115: 43–50. The Nubel article discusses how vinyl endgroups are present in the polyolefin's $^{13}C$ NMR spectra at 138.0 and 114.3 ppm when the COD reactant contains the 4-vinyl-1-cyclohexene impurity. This is consistent with Example 4 of U.S. Pat. No. 5,559,190 which describes how special NMR conditions (i.e., signal-to-noise ratio of about 100:1) are necessary to quantify low levels of non-functional end groups such as vinyl end groups.

Thus it is necessary that the reactants and solvents not contain impurities that yield non-functional end groups in the product of the present invention. Such impurities include olefins with vinyl groups and acyclic olefins.

The ratio of the cyclic olefin reactants to the acyclic olefin reactants is generally proportional to the molecular weight of the product of the present process. Thus, it is follows that the higher the molecular weight of the product, the less impurities (e.g., olefins with vinyl groups and undesired acyclic olefins) must be present in the cyclic olefin reactants in order to obtain a functionality number of about 2.0.

The following examples are exemplary only and are not to be considered as limiting the scope of the invention:

EXAMPLE I

The following example illustrates the process wherein YZ=$H_2$. Unexpectedly, both the ROMP reaction and the hydrogenation reaction (the addition reaction of $H_2$ to the carbon-to-carbon double bonds) occurred using only one catalyst system (a ruthenium-based catalyst system as described below).

The ROMP reaction of cis,cis-1,5-cyclooctadiene (1,5-COD) with cis-1,4 diacetoxy-2-butene (cis-1,4-DAB) was performed under 60 psig hydrogen atmosphere:

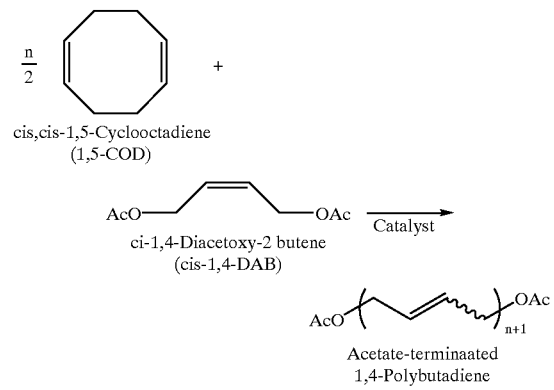

A solution consisting of 15.0 ml 1,5-COD (122 mmol, 99.9% purity by GC analysis), 3.7 ml 1,4-DAB (23 mmol, 95+% cis, TCI America), 0.098 g [$RuCl_2$(P-cymene)]$_2$ (0.16 mmol, Strem Chemicals Inc.), 0.18 g tricyclohexylphosphine (0.64 mmol, Aldrich), and 35 ml chlorobenzene (Aldrich HPLC grade, dried over 4A molecular sieves) was charged into an 8 ounce Fisher-Porter glass bottle under 1 atm $N_2$. Flame ionization detector (FID) gas chromatographic (GC) analysis of the cis-1,4-DAB reactant indicated that it contains 0.15 wt. % of the alkyne 2-butyne-1,4-diol diacetate; thus, the above solution contained 0.035 mmol 2-butyne-1,4-diol diacetate. The bottle was immersed in a 90° C. oil bath, pressurized to 60 psig (about five atmospheres) with hydrogen ($H_2$), sealed off under static hydrogen pressure (the valve to the hydrogen source was closed), and the liquid contents were magnetically stirred for 4 hours at 90° C. The pressure in the bottle dropped slowly during this time; it was 20 psig after 1 hour and ~2 psig after 4 hours. The bottle was cooled to room temperature after 4 hours at 90° C. Flame ionization detector gas chromatography (FID GC) analysis of the reaction solution indicated that conversion of COD was approximately 85% and conversion of 1,4-DAB was approximately 44%. Chlorobenzene solvent, COD, and some of the remaining DAB were removed by rotary evaporation under vacuum, affording 15 grams of a brown oily liquid product.

To remove catalyst residues, the brown oily liquid product was dissolved in 30 ml chlorobenzene (with 55 mg BHT (butylated hydroxy toluene) added) and filtered through a column of 25 grams silica gel (DAVISIL grade 923,100–200 mesh).

The column was washed with excess chlorobenzene, the washings were added to the filtrate, and the solvent was evaporated to afford 11–12 grams of product. This was washed with methanol by dissolving the product in 20 ml $CH_2Cl_2$, vigorously mixing with 200 ml methanol, and separating and discarding the methanol phase. The methanol-insoluble product was washed similarly with methanol two more times. Removal of residual methanol by rotary evaporation under vacuum afforded 5–6 grams of a final oily liquid product. GPC analysis of the final product was as follows: $M_n$=1660, $M_w$=2610, $M_w/M_n$=1.6 (THF solvent; polybutadiene calibration). The GPC chromatogram was roughly monomodal with a shoulder on the low-molecular weight side of the main peak.

A sample of the product was dissolved in $CDCl_3$ and analyzed by $^{13}C$ NMR spectroscopy using a Varian VXR-300 spectrometer; chromium acetylacetonate was added to the solution as a relaxation agent for the NMR studies. NMR analyses indicated that the product possessed a partially-hydrogenated 1,4-polybutadiene backbone structure with a 60:40 cis/trans carbon—carbon double bond ratio. It was estimated that 7–13% of the carbon—carbon double bonds were saturated (hydrogenated) relative to a pure unsaturated 1,4-polybutadiene backbone structure prepared under similar conditions as above but without the presence of $H_2$. The proportion of chain end groups observed by $^{13}C$ NMR was approximately 99% acetate-type end groups (—$CH_2OC(O)CH_3$) and approximately 1% vinyl endgroups (—CH=$CH_2$) indicating an acetate functionality number of 1.98 for the difunctional linear telechelic polymer product based upon the NMR data.

The analyses indicated that the product was a low-molecular weight, partially hydrogenated (partially-saturated) 1,4-polybutadiene material with acetate-type functional groups as the predominant type of chain end-group. Hydrogenation (addition reaction of $H_2$, occurred concurrently with the olefin metathesis (ring-opening olefin metathesis polymerization, or ROMP) reaction.

It is expected that hydrogenation increases with hydrogen pressure and about 50% of the carbon—carbon double bonds can be saturated (hydrogenated) by using a hydrogen pressure of 100–3000 psig.

EXAMPLE II

The following example illustrates the process wherein YZ=HBr.

A solution consisting of 0.098 g [$RuCl_2$(p-cymene)]$_2$ (0.16 mmol), 0.18 g tricyclohexylphosphine (0.64 mmol), 3.7 ml cis-1,4-diacetoxy-2-butene ("cis-1,4-DAB", 23 mmol), 15.0 ml cis,cis-1,5-cyclooctadiene ("1,5-COD", 122 mmol, 99.9% purity by GC analysis), and 35 ml chlorobenzene is charged into a glass pressure reactor under $N_2$ at atmospheric pressure (15 psia). Flame ionization detector (FID) gas chromatographic (GC) analysis of the cis-1,4-DAB reactant indicates that it contains 0.15 wt.% of the alkyne 2-butyne-1,4-diol diacetate; thus, the above solution contains 0.035 mmol 2-butyne-1,4-diol diacetate. The reactor is pressurized to 60 psig with gaseous HBr, sealed, and heated to 90° C. The reactor contents are stirred for several hours at 90° C. The reactor is cooled and the polymer product is isolated by evaporation of liquids (unreacted COD and DAB) and removal of catalyst residues by the procedure described in Example 1. The polymer product obtained is a partially-saturated 1,4-polybutadiene material with acetate-type chain endgroups. The polymer product, partially saturated due to addition of HBr to carbon-to-carbon double bonds, contains pendant Br groups on the polymer backbone. It is expected that such a polymer product has an acetate functionality number of about 2.0.

It is expected that other YZ reactants described herein will react in a similar fashion as the reactants in Examples I and II.

Thus, in view of the above, the invention concerns, in part, the following:

A process for the preparation of an addition product of a linear telechelic difunctional unsaturated polymer containing terminal functional reactive groups other than vinyl groups, comprising simultaneously reacting at least one cyclic olefin of from about 4 to 30 carbon atoms, at least one difunctional acyclic olefin of up to about 30 carbon atoms, and at least one reactant YZ in the presence of at least one olefin metathesis catalyst to prepare an addition product of a linear difunctional unsaturated polymer, wherein YZ is capable of adding to a carbon—carbon double bond under ROMP reaction conditions The above process wherein YZ is selected from the group consisting of $H_2$, $D_2$, $H_2O$, hydrogen peroxide, halogens, hydrogen halides, inorganic halohydrins wherein Y is a halogen and Z is hydroxyl, sulfuric acid, halogenated carbon compounds of up to 30 carbon atoms, alkyl and aryl halides of up to 30 carbon atoms, alcohols of the structure ROH wherein R is an alkyl, aryl, arylalkyl, halogenated alkyl, halogenated aryl, or halogenated arylalkyl group of up to 30 carbon atoms, and mixtures thereof.

The above process wherein said cyclic olefin is selected from the group consisting of cycloheptene; 1,3-cyclooctadiene; 1,4-cyclooctadiene: 1,5-cyclooctadiene, norbornene, norbornadiene, 2,2,2-bicyclooctene-2; cyclooctene; cyclodecene; methyl cyclooctadienes; dimethyl cyclooctadienes; methyl cyclooctenes; dimethyl cydooctenes; 1,4,7-cyclononatriene; 1,4-cyclodecadiene; 1,5-cyclododecadiene; 1,6cyclodecadiene; 1,7-cyclododecadiene; 1,4,7-cyclododecatriene; 1,5,gcyclododecatriene; trimethyl 1,5,9-cyclododecatriene; cyclopentene; cyclododecene; cyclobutene; 1,9,17-cyclotetracosatriene; 1-methyl-1,5-cyclooctadiene; 3-phenyl-1-cyclooctene; benzyl-1-cyclooctene; 3-tolyl-1-cyclooctene; 5-chloro-1-cyclooctene; 1-chloro-1,5-cyclooctadiene; 5-chloro-1-cyclododecene; 5,5-dichloro-1-cyclooctene; and mixtures thereof.

The above process wherein said acyclic olefin is selected from the group consisting of 3-hexenedioic acid, esters of 3-hexenedioic acid, 2-butene-1,4-diol, esters of 2-butene-1,4-diol, and mixtures thereof.

The above process wherein said esters of 2-butene-1,4-diol are selected from the group consisting of monoacetate, diacetate, monopropionate, dipropionate, monobutyrate, dibutyrate, monobenzoate, dibenzoate, monopivalate, and dipivalate.

The above process of wherein said esters of 3-hexenedioic acid are selected from the group consisting of dimethyl 3-hexenedioate and diethyl 3-hexenedioate.

The above process wherein the functional groups of said difunctional acyclic olefin are selected from the group consisting of hydroxyl, nitrile, ester, alcohol, amine, acid, acyl halide, ketone, aldehyde, borane, amide, acid anhydride, ether, imide, halogen atom, alkyne, alkyl, aryl and substituted aryl groups of up to about 30 carbon atoms, and mixtures thereof.

The above process wherein said halogen is $F_2$, $Cl_2$, $Br_2$, or $I_2$, wherein said hydrogen halide is HF, HCl, HBr, or HI, wherein said halogenated carbon compound contains up to about 12 (or about 8 or about 6) carbon atoms, wherein said alkyl and aryl halide contains up to about 12 carbon atoms, and wherein said R is an alkyl, aryl, arylalkyl, halogenated alkyl, halogenated aryl, or halogenated arylalkyl group of up to about 12 (or about 8 or about 6) carbon atoms.

The above process wherein said olefin metathesis catalyst is a ruthenium-based catalyst system comprising a ruthenium compound (A), a phosphorus compound (B), and a compound (C) containing a carbon-to-carbon triple bond, wherein mole ratios of A:B:C expressed as compounds are in the range of about 1.0:0.01–100:0.01–100, said ruthenium compound (A) is a Ru(II), Ru(III), or Ru(IV) compound containing an anionic ligand (X) and optionally containing an arene ligand and optionally a phosphorus compound ligand; provided that said phosphorus compound (B) is optional if said ruthenium compound (A) contains a phosphorus-containing ligand.

The above process wherein said cyclic olefin is cis,cis-1, 5-cyclooctadiene, wherein said difunctional acyclic olefin is cis-1,4 diacetoxy-2-butene, wherein said reactant YZ is $H_2$, HBr or $Br_2$, wherein said compound (A) is $(RuCl_2(p\text{-}cymene))_2$, wherein said compound (B) is tricyclohexylphosphine, and wherein said compound (C) is 2-butyne-1,4-diol diacetate.

The above process wherein said process is conducted at a temperature of from about −20° C. to about 250° C. and is conducted at a pressure of from about 1 to about 1000 atmospheres.

The above process wherein said difunctional acyclic olefin is produced by a process comprising an olefin metathesis reaction of acyclic linear olefinic compound reactants comprising at least one of said acyclic olefinic compound reactants containing up to 30 carbon atoms and containing at least one functional reactive group selected from reactive moieties consisting of a hydroxy, nitrile, ester, alcohol, amine, acid, acyl halide, ketone, aldehyde, borane, amide, acid anhydride, ether, imide, halogen atom, alkyne, alkyl, aryl and substituted aryl groups of up to about 30 carbon atoms, and mixtures thereof, the substituents of said substituted aryl group comprising one reactive substituent of said functional reactive group of moieties, and combinations of said reactive moieties to prepare a linear functional olefinic compound product having two functional terminal reactive moieties, and an olefinic compound product of lower molecular weight than said one of acylic linear olefinic compound reactants, and further comprising separating said olefinic compound product of lower molecular weight from said linear functional olefinic compound product having two functional terminal reactive moieties.

The above process wherein said acyclic olefinic compound reactant is selected from the group consisting of alkyl or aryl acrylates of up to 30 carbon atoms, alkyl or aryl methacrylates of up to 30 carbon atoms, alkyl or aryl undecylenates of up to 30 carbon atoms, allyl acetate, allyl propionate, allyl butyrate, allyl benzoate, allyl pivalate, and vinyl acetate.

The above process wherein Y is H or a halide and Z is H, a halide or hydroxyl.

The above process wherein Y and Z are selected independently from H and halide.

The present invention also concerns, in part, using the following ruthenium-based catalyst system in the present process:

A ruthenium-based catalyst system comprising a ruthenium compound (A), a phosphorus compound (B), and a compound (C) containing a carbon-to-carbon triple bond, wherein mole ratios of A:B:C expressed as compounds are in the range of about 1.0:0.01–100:0.01–100, said ruthenium compound (A) is a Ru(II), Ru(III), or Ru(IV) compound containing an anionic ligand (X) and optionally containing an arene ligand and optionally a phosphorus compound ligand;

provided that said phosphorus compound (B) is optional if said ruthenium compound (A) contains a phosphorus-containing ligand.

The above ruthenium-based catalyst system wherein said ruthenium compound (A) is represented by the formula

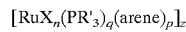

where n=2, 3, or 4; q=0, 1, 2, 3, or 4; p=0 or 1; and z=1 or 2.

The above ruthenium-based catalyst system wherein said mole ratios of A:B:C expressed as compounds are in the range of about 1.0:0.140:0.140 (or about 1.0:0.2–20:0.2–20).

The above ruthenium-based catalyst system wherein X is an aliphatic anionic ligand (e.g., containing up to 20 or up to 12 or up to 8 or up to 6 carbon atoms such as methyl, ethyl, propyl, isopropyl, butyl, or hexyl) or an aromatic anionic ligand (e.g., containing up to 20 or up to 12 or up to 8 or up to 6 carbon atoms such as phenyl or benzyl), or wherein X is halogen (F, Cl, Br, and 1), hydroxide, or alkoxide (e.g., $OR^3$ wherein $R^3$ is selected from the group consisting of alkyl, cycloalkyl, aryl, and alkylaryl groups (e.g., of up to about 20 or up to about 12 or up to about 8 or up to about 6 carbon atoms)), or wherein X is selected from the group consisting of nitrate, nitrite, acetate, trifluoroacetate, acetylacetonate, hexafluoroacetylacetonate, and mixtures thereof.

The above ruthenium-based catalyst system wherein R' is selected from R and (OR) where each of the R groups are the same or are independently selected from the group consisting of hydrogen, alkyl, cycloalkyl, aryl and arylalkyl groups (e.g., each group of up to about 20 or up to about 12 or up to about 8 or up to about 6 carbon atoms), unsubstituted or substituted (e.g., wherein the substituents may be halogen (F, Cl, Br, and I), or alkyl or aryl groups (e.g., of up to about 20 or up to about 12 or up to about 8 or up to about 6 carbon atoms)); if R' is OR then R' and R are not hydrogen; and if R' is R then at least one R is not hydrogen.

The above ruthenium-based catalyst system wherein said arene ligand of said ruthenium compound (A) is selected from the group consisting of an unsubstituted aromatic ligand (e.g., of up to about 30 or about 20 or about 15 carbon atoms), a substituted aromatic ligand (e.g., of up to about 30 or about 20 or about 15 carbon atoms), and mixtures thereof, wherein the substituents of said substituted aromatic ligand of said arene group of said ruthenium compound (A) are selected from the group consisting of halogen (F, Cl, Br, and I), alkyl and aryl groups (e.g., groups of up to about 25 or about 20 or about 12 or about 8 carbon atoms), trialkylsilyl and triarylsilyl groups (e.g., groups of up to about 25 or about 20 or about 15 or about 8 carbon atoms), and mixtures thereof. The arene ligand may be selected from alkylbenzenes, polyalkylbenzenes, arylbenzenes, polyarylbenzenes, halobenzenes, haloalkylbenzenes, haloarylbenzenes, alkylnaphthalenes, arylnaphthalenes, polyalkylnaphthalenes, polyarylnaphthalenes, halonaphthalenes, haloalkylnaphthalenes, and haloaryinaphthalenes. The arene ligand may be selected from the group consisting of benzene, toluene, xylene, cumene, cymene, p-cymene, durene, trimethylsilylbenzene, 1,4-bis (trimethylsilyl) benzene, and naphthalene.

The above ruthenium-based catalyst system wherein said phosphorus compound (B) is selected from the group consisting of phosphine compounds and phosphite compounds of the formulae $PR_3$, $P(OR)_3$, $PH_2R$, $PHRR^1$, $PRR^1R^2$, and $P(OR)(OR^1)(OR^2)$, wherein R, $R^1$ and $R^2$ are the same or are independently selected from the group consisting of unsubstituted and substituted alkyl, cycloalkyl, aryl and arylalkyl groups (e.g., groups of up to about 20 or about 12 or about 8 or about 6 carbon atoms), wherein the substituents may be halogen (F, Cl, Br, and I), alkyl or aryl moieties of up to 20 carbon atoms (preferably up to about 12 carbon atoms, more preferably up to about 8 carbon atoms, most preferably up to about 6 carbon atoms). Phosphorus compound (B) is preferably a phosphine compound, more preferably a trialkyl or -cycloalkyl phosphine (where each alkyl or cycloalkyl is $C_3$ to $C_8$), e.g., selected from the group consisting of tricyclohexylphosphine, triisopropylphosphine, and tricyclopentylphosphine.

The above ruthenium-based catalyst system wherein said compound (C) is a substituted or unsubstituted alkyne (e.g., of up to about 20 or up to about 16 or up to about 12 or up to about 8 carbon atoms), or is selected from the group consisting of a terminal alkyne, an internal alkyne, an alkyne possessing one or more aliphatic, aromatic, halogen (F, Cl, Br, and I), ester, hydroxyl, ketone, aldehyde, ether, carboxyl, amide, anhydride, nitrile, silyl or amine groups, and mixtures thereof, or is preferably selected from the group consisting of acetylene, propyne, 1-butyne, 2-butyne, 1-pentyne, 2-pentyne, 1-hexyne, 2-hexyne, 3-hexyne, 1-heptyne, 1-octyne, 1-decyne, 1-dodecyne, trimethylsilylacetylene, phenylacetylene, diphenylacetylene, 2-butyne-1,4-diol, ester derivatives of 2-butyne-1,4-diol such as 1,4-diacetoxy-2-butyne, 2-butyne-1,4-diol monoacetate, 2-butyne-1,4-diol diacetate, 2-butyne-1,4-diol monopropionate, 2-butyne-1,4-diol dipropionate, 2-butyne-1,4-diol monobenzoate, 2-butyne-1,4-diol dibenzoate, propargyl alcohol and ester derivatives of propargyl alcohol such as propargyl acetate, propargyl propionate, propargyl butyrate, propargyl benzoate, and propargyl pivalate.

The above ruthenium-based catalyst system wherein hydrogen ($H_2$) is present as a catalyst system activator at a partial pressure of hydrogen of from $1 \times 10^{-2}$ mm Hg to about 200 atmospheres (or 0.1 mm Hg to about 100 atmospheres or 1 mm Hg to about 20 atmospheres).

The above ruthenium-based catalyst system wherein said ruthenium compound (A) is selected from the group consisting of $[RuCl_2(p\text{-cymene})]_2$, $[RuCl_2(4\text{-tert-butyltoluene})]_2$, $[RuCl_2(1,3\text{-diisopropylbenzene})]_2$, $[RuCl_2(1,4\text{-diisopropylbenzene})]_2$, and $[RuCl_2(1,3,5\text{-triisopropylbenzene})]_2$, said phosphorus compound (B) is tricyclohexylphosphine, and said compound containing a carbon-to-carbon triple bond (C) is selected from the group consisting of 1,4-diacetoxy-2-butyne, 3-hexyne, and 1-decyne.

The above ruthenium-based catalyst system wherein said ruthenium compound (A) is selected from the group consisting of $[RuX_2(arene)]_2$, $RuX_2(arene)(PRR^1R^2)$, $RuX_2(arene)(PHRR^1)$, $RuX_2(arene)(PH_2R)$, $RuX_2(arene)[P(OR)(OR^1)(OR^2)]$, $RuX_3$, $RuX_3$-hydrate, $RuX_2(PRR^1R^2)_3$, $RuX_2(PHRR^1)_3$, $RuX_2(PH_2R)_3$, $RuX_2[P(OR)(OR^1)(OR^2)]_3$, $RuX_2(PRR^1R^2)_4$, $RuX_2(PHRR^1)_4$, $RuX_2(PH_2R)_4$, and $RuX_2[P(OR)(OR^1)(OR\,2)]_4$, wherein P is phosphorus, X is selected from the group consisting of an aliphatic anionic ligand, an aromatic anionic ligand, halogen (F, Cl, Br, and I), hydroxide, alkoxide, nitrate, nitrite, acetate, trifluoroacetate, acetylacetonate, hexafluoroacetylacetonate, and mixtures thereof, wherein R, $R^1$ and $R^2$ are the same or are independently selected from the group consisting of unsubstituted and substituted alkyl, cycloalkyl, aryl, and arylalkyl groups, wherein the arene group of said ruthenium compound (A) is selected from the group consisting of an unsubstituted aromatic ligand, a substituted aromatic ligand, and mixtures thereof.

Further variations and modifications of the invention will become apparent to those skilled in the art from the foregoing and are intended to be encompassed by the claims appended hereto.

The following U.S. patents and patent application are incorporated herein by reference in their entirety (especially for their teachings concerning catalysts and reactants such as cyclic olefins and acyclic olefins which may be utilized in the present invention): U.S. Pat. Nos. 5,519,101; 5,403,904; 5,512,635; 5,589,548; 5,559,190; 5,589,543; 5,621,047; and Ser. No. 08/706,893 filed on Sep. 3, 1996.

U.S. patent application Ser. No. 08/842,251 filed on Apr. 24, 1997 and PCT application PCT/US97/06937filed on Apr. 25, 1997 are incorporated herein by reference in their entirety (especially for their teachings concerning ruthenium-based metathesis catalyst systems which may be utilized in the present invention).

What is claimed is:

1. A process for the preparation of an addition product of a linear telechelic difunctional unsaturated polymer containing terminal functional reactive groups other than vinyl groups, comprising simultaneously reacting at least one cyclic olefin of from about 4 to 30 carbon atoms, at least one difunctional acyclic olefin of up to about 30 carbon atoms, and at least one reactant YZ in the presence of at least one olefin metathesis catalyst to prepare an addition product of a linear difunctional unsaturated polymer, wherein YZ adds to a carbon—carbon double bond under ROMP reaction conditions.

2. The process of claim 1 wherein YZ is selected from the group consisting of $D_2$, $H_2O$, hydrogen peroxide, halogens, hydrogen halides, inorganic halohydrins wherein Y is a halogen and Z is hydroxyl, sulfuric acid, halogenated carbon compounds of up to 30 carbon atoms, alkyl and aryl halides of up to 30 carbon atoms, alcohols of the structure ROH wherein R is an alkyl, aryl, arylalkyl, halogenated alkyl, halogenated aryl, or halogenated arylalkyl group of up to 30 carbon atoms, and mixtures thereof.

3. The process of claim 1 wherein said cyclic olefin is selected from the group consisting of cycloheptene; 1,3-cyclooctadiene; 1,4-cyclooctadiene; norbornene, norbornadiene, 2,2,2-bicyclooctene-2; cyclooctene; cyclodecene; methyl cyclooctadienes; dimethyl cyclooctadienes; methyl cyclooctenes; dimethyl cyclooctenes; 1,4,7-cyclononatriene; 1,4-cyclodecadiene; 1,5-cyclododecadiene; 1,6-cyclodecadiene; 1,7-cyclododecadiene; 1,4,7-cyclododecatriene; 1,5,9-cyclododecatriene; trimethyl 1,5,9-cyclododecatriene; cyclopentene; cyclododecene; cyclobutene; 1,9,17-cyclotetracosatriene; 1-methyl-1,5-cyclooctadiene; 3-phenyl-1-cyclooctene; 3-benzyl-1-cyclooctene; 3-tolyl-1-cyclooctene; 5-chloro-1-cyclooctene; 1-chloro-1,5-cyclooctadiene; 5-chloro-1-cyclododecene; 5,5-dichloro-1-cyclooctene; and mixtures thereof.

4. The process of claim 1 wherein said acyclic olefin is selected from the group consisting of 3-hexenedioic acid, esters of 3-hexenedioic acid, 2-butene-1,4-diol, [esters of 2-butene-1,4-diol,] and mixtures thereof.

5. The process of claim 4 wherein said esters of 3-hexenedioic acid are selected from the group consisting of dimethyl 3-hexenedioate and diethyl 3-hexenedioate.

6. The process of claim 1 wherein the functional groups of said difunctional acyclic olefin are selected from the group consisting of hydroxyl, nitrile, ester, alcohol, amine, acid, acyl halide, ketone, aldehyde, borane, amide, acid anhydride, ether, imide, halogen atom, alkyne, alkyl, aryl and substituted aryl groups of up to about 30 carbon atoms, and mixtures thereof.

7. The process of claim 2 wherein said halogen is $F_2$, $Cl_2$, $Br_2$, or $I_2$, wherein said hydrogen halide is HF, HCl, HBr, or HI, wherein said halogenated carbon compound contains up to about 12 carbon atoms, wherein said alkyl and aryl halide contains up to about 12 carbon atoms, and wherein said R is an alkyl, aryl, arylalkyl, halogenated alkyl, halogenated aryl, or halogenated arylalkyl group of up to about 12 carbon atoms.

8. The process of claim 7 wherein said halogenated carbon compound contains up to about 8 carbon atoms, wherein said alkyl and aryl halide contains up to about 8 carbon atoms, and wherein said R is an alkyl, aryl, arylalkyl, halogenated alkyl, halogenated aryl, or halogenated arylalkyl group of up to about 8 carbon atoms.

9. The process of claim 8 wherein said halogenated carbon compound contains up to about 6 carbon atoms, wherein said alkyl and aryl halide contains up to about 6 carbon atoms, and wherein said R is an alkyl, aryl, arylalkyl, halogenated alkyl, halogenated aryl, or halogenated arylalkyl group of up to about 6 carbon atoms.

10. The process of claim 1 wherein said olefin metathesis catalyst is a ruthenium-based catalyst system comprising a ruthenium compound (A), a phosphorus compound (B), and a compound (C) containing a carbon-to-carbon triple bond, wherein mole ratios of A:B:C expressed as compounds are in the range of about 1.0:0.01–100:0.01–100, said ruthenium compound (A) is a Ru(II), Ru(III), or Ru(IV) compound containing an anionic ligand (X) and optionally containing an arene ligand and optionally phosphorus compound ligand;

provided that said phosphorus compound (B) is optional if said ruthenium compound (A) contains a phosphorus-containing ligand.

11. The process of claim 10 wherein said difunctional acyclic olefin is cis-1,4 diacetoxy-2-butene, wherein said reactant YZ is HBr or $Br_2$, wherein said compound (A) is $(RuCl_2(p\text{-cymene}))_2$, wherein said compound (B) is tricyclohexylphosphine, and wherein said compound (C) is 2-butyne-1,4-diol diacetate.

12. The process of claim 1 wherein said process is conducted at a temperature of from about −20° C. to about 250° C. and is conducted at a pressure of from about 0.1 to about 1000 atmospheres.

13. The process of claim 1 wherein said difunctional acyclic olefin is produced by a process comprising an olefin metathesis reaction of acyclic linear olefinic compound reactants comprising at least one of said acyclic olefinic compound reactants containing up to 30 carbon atoms and containing at least one functional reactive group selected from reactive moieties consisting of a hydroxy, nitrile, ester, alcohol, amine, acid, acyl halide, ketone, aldehyde, borane, amide, acid anhydride, ether, imide, halogen atom, alkyne, aryl and substituted aryl groups of up to about 30 carbon atoms, and mixtures thereof, the substituents of said substituted aryl group comprising one reactive substituent of said functional reactive group of moieties, and combinations of said reactive moieties to prepare a linear functional olefinic compound product having two functional terminal reactive moieties, and an olefinic compound product of lower molecular weight than said one of acylic linear olefinic compound reactants, and further comprising separating said olefinic compound product of lower molecular weight from said linear functional olefinic compound product having two functional terminal reactive moieties.

14. The process of claim 13 wherein said acyclic olefinic compound reactant is selected from the group consisting of alkyl or aryl acrylates of up to 30 carbon atoms, alkyl or aryl methacrylates of up to 30 carbon atoms, alkyl or aryl undecylenates of up to 30 carbon atoms, allyl acetate, allyl propionate, allyl butyrate, allyl benzoate, allyl pivalate, and vinyl acetate.

15. The process of claim 1 wherein Y is H or a halide and Z is a halide or hydroxyl.

16. The process of claim 1 wherein Y is H or a halide and Z is a halide.

* * * * *